US009609116B2

(12) United States Patent
Ylönen

(10) Patent No.: US 9,609,116 B2
(45) Date of Patent: Mar. 28, 2017

(54) ESTABLISHING AN AD-HOC GROUP BASED ON ADDRESSES IN AN E-MAIL

(75) Inventor: Otso Ylönen, Salo (FI)

(73) Assignee: Nokia Technologies Oy, Espoo (FI)

( * ) Notice: Subject to any disclaimer, the term of this patent is extended or adjusted under 35 U.S.C. 154(b) by 2370 days.

(21) Appl. No.: 11/048,643

(22) Filed: Jan. 31, 2005

(65) Prior Publication Data

US 2006/0173962 A1     Aug. 3, 2006

(51) Int. Cl.
| | |
|---|---|
| *G06F 15/16* | (2006.01) |
| *H04M 1/725* | (2006.01) |
| *G06Q 10/10* | (2012.01) |
| *H04L 12/18* | (2006.01) |
| *H04L 12/58* | (2006.01) |

(52) U.S. Cl.
CPC ...... *H04M 1/72552* (2013.01); *G06Q 10/107* (2013.01); *H04L 12/1818* (2013.01); *H04L 51/046* (2013.01); *H04L 51/28* (2013.01)

(58) Field of Classification Search
CPC ........... H04L 29/120009; H04L 51/046; H04L 51/28; H04L 12/1818; H04L 12/189; H04L 12/1822; H04L 29/06027; H04L 65/1006; H04L 65/4038
USPC .......................................... 709/204, 205–206
See application file for complete search history.

(56) References Cited

U.S. PATENT DOCUMENTS

| | | | | | |
|---|---|---|---|---|---|
| 6,131,432 | A | * | 10/2000 | Miyata ...................... | B21B 1/28 |
| | | | | | 72/252.5 |
| 6,134,432 | A | * | 10/2000 | Holmes ................... | H04W 4/12 |
| | | | | | 340/7.29 |
| 6,484,196 | B1 | * | 11/2002 | Maurille ........................ | 709/206 |
| 6,789,107 | B1 | * | 9/2004 | Bates et al. ................... | 709/206 |

(Continued)

FOREIGN PATENT DOCUMENTS

| | | |
|---|---|---|
| EP | 1424820 A1 | 6/2004 |
| WO | 02/073886 A1 | 9/2002 |

(Continued)

OTHER PUBLICATIONS

Supplementary European Search Report for European Patent Application No. 05 79 4414 dated Feb. 28, 2013, pp. 1-5.

(Continued)

*Primary Examiner* — Farzana Huq
(74) *Attorney, Agent, or Firm* — Ditthavong & Steiner, P.C.

(57) ABSTRACT

This invention describes a method for establishing an ad-hoc group based on addresses of users in a message (e.g., an e-mail) received or sent using a pre-selected communication method (e.g., an e-mail communication) by an electronic device. Any recipient or a sender of the e-mail message can use the e-mail addresses in the message in order to establish a permanent (stored in the device) or a temporary (used immediately in a context of another communication application) ad-hoc group. The user may select all or only a part of the people (other users) into the ad-hoc group. The (Continued)

group-data can have several types of addresses of users such as phone numbers, SIP addresses, wireless village IDs, etc. needed in conjunction with desired applications. Creating the ad-hoc group from the e-mail message can utilize information that already exists in the electronic device and, if needed, acquired additional information from a remote service.

18 Claims, 2 Drawing Sheets

(56) References Cited

U.S. PATENT DOCUMENTS

| | | | | |
|---|---|---|---|---|
| 6,970,907 | B1* | 11/2005 | Ullmann et al. | 709/206 |
| 7,844,906 | B2* | 11/2010 | Berger | G06F 1/1622 |
| | | | | 715/747 |
| 2002/0098849 | A1 | 7/2002 | Bloebaum et al. | |
| 2003/0060168 | A1* | 3/2003 | Teibel | 455/69 |
| 2003/0112952 | A1* | 6/2003 | Brown et al. | 379/211.01 |
| 2004/0010606 | A1 | 1/2004 | Delaney et al. | |
| 2004/0024762 | A1 | 2/2004 | Agarwal et al. | |
| 2004/0057449 | A1 | 3/2004 | Black | |
| 2004/0246332 | A1* | 12/2004 | Crouch | 348/14.08 |
| 2004/0260756 | A1* | 12/2004 | Forstall et al. | 709/200 |
| 2004/0268265 | A1* | 12/2004 | Berger | 715/752 |
| 2005/0102358 | A1* | 5/2005 | Gold et al. | 709/204 |
| 2005/0188016 | A1* | 8/2005 | Vdaygiri et al. | 709/205 |
| 2005/0198140 | A1* | 9/2005 | Itoh | H04L 12/1813 |
| | | | | 709/205 |
| 2006/0053225 | A1* | 3/2006 | Poikselka et al. | 709/227 |
| 2006/0154603 | A1* | 7/2006 | Sachs et al. | 455/39 |
| 2006/0168315 | A1* | 7/2006 | Daniell | G06Q 10/107 |
| | | | | 709/237 |
| 2007/0016647 | A1* | 1/2007 | Gupta | G06Q 10/107 |
| | | | | 709/206 |
| 2007/0258473 | A1* | 11/2007 | Ruffino | H04L 29/12009 |
| | | | | 370/401 |
| 2009/0144634 | A1* | 6/2009 | Berger | 715/747 |

FOREIGN PATENT DOCUMENTS

| | | |
|---|---|---|
| WO | PCT/FI2004/050028 | 3/2004 |
| WO | WO2004114643 | 12/2004 |
| WO | 2005/006165 A1 | 1/2005 |
| WO | WO2005053266 | 6/2005 |

OTHER PUBLICATIONS

Office Action for corresponding European Patent Application No. 057944142-1862, dated May 25, 2016, 4 pages.

* cited by examiner

ESTABLISHING AN AD-HOC GROUP BASED ON ADDRESSES IN AN E-MAIL

FIELD OF THE INVENTION

This invention generally relates to a message management and more specifically to establishing an ad-hoc group based on addresses in a message received or sent method by an electronic device.

BACKGROUND ART

An e-mail is used increasingly as a way of reaching several people at once. This happens both in formal and informal contexts. In corporate environments and organizations e-mail distribution lists are widely used to help users to easily reach the same predefined group if needed. The lists, however, are often managed by a third party and the creation of them is not possible for the e-mail end-user, especially on an ad-hoc basis.

Even being very efficient, the e-mail has its limitations when many people need to discuss or agree on a subject. Sometimes it is more practical to establish an interactive communication, e.g., using a teleconference, an on-line chat session or a face-to-face meeting. There is a need for a simple way to contact the sender and all receivers of an e-mail message, e.g., by establishing a conference call with them.

It is often necessary to repeatedly send e-mail messages and communicate with the same group of people. It is impractical and time-consuming to go and check the names or addresses of relevant people from an old e-mail message. Thus, there is a need for both the sender and all receivers of an e-mail message to be able to create an address group for later usage, containing details of the sender and all the recipients.

E-mail applications in PCs (personal computers), PDAs (personal digital assistants), mobile phones, etc. do not allow the establishment of another type of a group communication session from within the e-mail message, though calling to a single person (user) is possible in many implementations (e.g., an MS Outlook). As well-known, the PCs, PDAs, mobile phones, etc. have capabilities for storing phone numbers, e-mail addresses, etc. However, none of these devices can create a group of contacts based on the e-mail message.

DISCLOSURE OF THE INVENTION

The object of the present invention is to provide a novel method for establishing an ad-hoc group based on addresses in a message (e.g., an e-mail) received or sent using a pre-selected communication method (e.g., an e-mail communication) by an electronic device such as a portable communication device, a mobile electronic device or a mobile phone.

According to a first aspect of the invention, a method for establishing an ad-hoc group based on addresses in a message received or sent using a pre-selected communication method by an electronic device, comprises the steps of: receiving or sending the message containing addresses of a group of multiple users by the electronic device, wherein the addresses of the multiple users are used for delivering the message using the pre-selected communication method to the multiple users; creating by the electronic device group-data for the ad-hoc group of users out of the group of the multiple users with the addresses contained in the message, wherein a number of the users is equal or less than the number of the multiple users, wherein the group-data contains parameters for each of the users for applying at least one further communication method, different from the pre-selected communication method, for communicating of the electronic device with at least one of the each of the users using at least one of the parameters, the parameters being different than the addresses.

According further to the first aspect of the invention, the message may be an e-mail message.

Further according to the first aspect of the invention, the message may be an instant message.

Still further according to the first aspect of the invention, the group-data may be stored in the electronic device permanently for any future use.

According further to the first aspect of the invention, the ad-hoc group may be a temporary group; the group-data may be used immediately by the electronic device after being generated and the group-data is not to be stored in the electronic device permanently.

According still further to the first aspect of the invention, the electronic device may have capabilities to acquire additional information regarding the parameters from a remote service.

According further still to the first aspect of the invention, after the step of receiving or sending the message, the method comprises the step of: providing automatically by the electronic device an option to a user of the electronic device for creating the group-data for the ad-hoc group of the users.

According yet further still to the first aspect of the invention, after the step of creating the group-data for the ad-hoc group, the method may comprise the step of: providing automatically by the electronic device an option to a user of the electronic device for applying at least one further communication method using at least one of the parameters.

Yet still further according to the first aspect of the invention, the creating the group-data and the applying the at least one further communication method may be based on instructions from a user of the electronic device.

According to a second aspect of the invention, a computer program product comprises: a computer readable storage structure embodying computer program code thereon for execution by a computer processor with the computer program code characterized in that it includes instructions for performing the steps of the method of the first aspect of the invention indicated as being performed by the electronic device.

According to a third aspect of the invention, an electronic device capable of establishing an ad-hoc group based on addresses in a message received or sent using a pre-selected communication method by the electronic device, comprises: a receiving/sending module, for receiving or sending the message containing addresses of a group of multiple users by the electronic device, wherein the addresses of the multiple users are used for delivering the message using the pre-selected communication method to the multiple users; a message control module, for creating group-data for the ad-hoc group of users out of the group of the multiple users with the addresses contained in the message, wherein a number of the users is equal or less than the number of the multiple users, wherein the group-data contains parameters for each of the users for applying at least one further communication method, different from the pre-selected communication method, for communicating of the electronic device with at least one of the each of the users using at least one of the parameters, the parameters being different than the addresses.

According further to the third aspect of the invention, the message may be an e-mail message.

Further according to the third aspect of the invention, the message may be an instant message.

Still further according to the third aspect of the invention, the electronic device may further comprise: a user and group storage module, for storing the group-data permanently in the electronic device for any future use.

According further to the third aspect of the invention, the ad-hoc group may be a temporary group; the group-data may be used immediately by the electronic device after being generated and the group-data is not stored in the electronic device permanently.

According still further to the third aspect of the invention, the message control module may have capabilities to acquire additional information regarding the parameters from a remote service.

According yet further still to the third aspect of the invention, the message control module may provide automatically an option to a user of the electronic device for creating the group-data for the ad-hoc group of the users.

According further still to the third aspect of the invention, the message control module may provide automatically an option to a user of the electronic device for the applying the at least one further communication method using the at least one of the parameters.

Yet still further according to the third aspect of the invention, the creating the group-data and the applying the at least one further communication method may be based on instructions from a user of the electronic device.

According to a fourth aspect of the invention, a system capable of sending and receiving a message between multiple users using a pre-selected communication method, wherein the message is sent from one of the multiple users to other multiple users from the multiple users and wherein each of the multiple users for facilitating the sending or the receiving utilizes an electronic device capable of establishing an ad-hoc group based on addresses in the message received or sent using the pre-selected communication method by the electronic device, and wherein the electronic device comprises: a receiving/sending module, for receiving or sending the message containing addresses of a group of the multiple users by the electronic device, wherein the addresses of the multiple users are used for delivering the message using the pre-selected communication method to the multiple users; a message control module, for creating group-data for the ad-hoc group of users out of the group of the multiple users with the addresses contained in the message, wherein a number of the users is equal or less than the number of the multiple users, wherein the group-data contains parameters for each of the users for applying at least one further communication method different from the pre-selected communication method for communicating of the electronic device with at least one of the each of the users using at least one of the parameters, the parameters being different than the addresses.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

Figure 1:
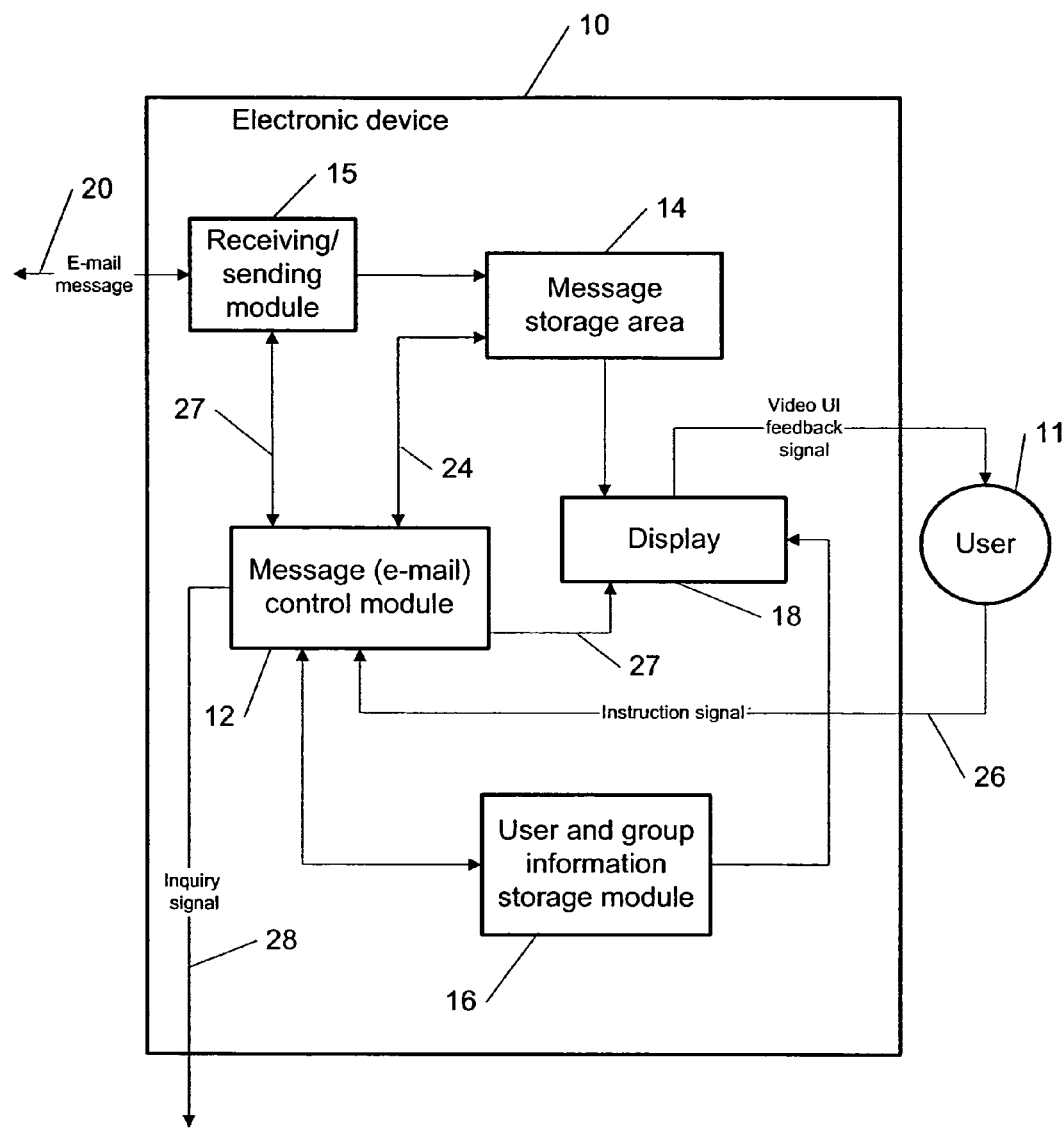
FIG. 1 is a block diagram of an electronic device for establishing an ad-hoc group based on addresses in an e-mail message received or sent by an electronic device, according to the present invention.

The present invention provides a new methodology for establishing an ad-hoc group based on addresses in a message (e.g., an e-mail) received or sent using a pre-selected communication method (e.g., an e-mail communication) by an electronic device such as a portable communication device, a mobile electronic device or a mobile phone. The present invention applies not only to messages facilitated by an electronic mail (e-mail) mentioned above but also to messages facilitated by an instant message or some other possible emerging technologies.

According to the present invention, any recipient or the sender of, e.g., the e-mail message is given the opportunity to use the e-mail addresses in the message (including both the sender and all the recipients) in order to establish a permanent or a temporary group (an ad-hoc group). The ad-hoc group can be stored permanently in the electronic device for a future use or it can be used immediately in a context of another communication application. The user may be given the possibility to select only a part of the people into the group. According to the present invention, the user interface (UI) of the e-mail application in the electronic device can have additional functions that are most relevant for the particular application of the electronic device: e.g., "Create Group" or "Make Conference Call".

The UI of the e-mail message viewer can provide either a hard or a soft button or a menu item that may be used to create a new contact (ad-hoc) group using the addresses in the message. The contacts in the group can have several types of addresses such as phone numbers, session initiated protocol (SIP) addresses, wireless village IDs, a plain IP address, etc. needed in conjunction with desired applications. Creating the ad-hoc group from the message (e.g., the e-mail message) can utilize any of the contact information that already exists in the electronic device and, if needed, can acquire additional information from a remote service. Several practical examples for applying the present invention are provided below.

1. Creating the ad-hoc group from the e-mail: there are often informally established groups of colleagues or friends who send each other e-mail messages. By using the "create new group" function, it is easy to store the list of recipients' addresses for future use, either within the e-mail or other applications like Instant Messaging or Push-to-Talk.

2. Creating a teleconference from the e-mail: in an e-mail discussion between colleagues, it is concluded that the teleconference is needed in order to efficiently discuss a particular topic. It is agreed that one of the participants sets up the meeting. He/she selects the option "Make a Teleconference" which guides him/her step-by-step through the process of connecting everybody to the conference.

3. Sharing an application from the e-mail: an e-mail discussion can lead to a need for showing everyone some content, such as a photograph or a text document. By having a capability to "Share This with Everyone" within the context of the e-mail message, the device finds the necessary addresses (e.g., the SIP addresses) of each participant in the e-mail discussion, and invites them to an application sharing session.

4. Sending an SMS/MMS to the ad-hoc group.

5. Establishing a push-to-talk call within the ad-hoc group.

6. Inviting people to join an Instant Messaging chat group.

FIG. 1 shows one example among many other possible scenarios of a block diagram of an electronic device 10 (e.g., a portable communication device, a mobile electronic device or a mobile phone) for establishing an ad-hoc group based on addresses in the e-mail message received or sent by an electronic device 10, according to the present invention. The example of FIG. 1 applies to e-mail messages, but, as it was pointed out above, the messages to which the present invention can be applied include messages facilitated by the instant messages or some other possible emerging technologies.

A receiving/sending module 15 receives or sends through a line 20 a message (e.g., the e-mail message) containing addresses of a group of multiple users (including both the sender and all the recipients), wherein the addresses of the multiple users are used for delivering the e-mail message using a pre-selected communication method to the multiple users. The sent message is generated by a message control module 12 and provided to the receiving/sending module 15 for sending out the e-mail message to the addresses of the multiple users of said group. The message storage area 14 can be routinely used for storing the received, as well as, sent messages.

Thus, the message (e-mail) control module 12 gets the list of the multiple users of said group from the sent message generated directly in the block 12 or, e.g., from the e-mail message retrieved from the block 14 (assuming that the received messages are stored in the block 14) using a line 24. According to the present invention, the message control module 12 can create group-data for the ad-hoc group of said users out of the group of the multiple users with the addresses contained in the e-mail message (including both the sender and all the recipients), wherein a number of the users in the ad-hoc group can be equal or can be less than the number of said multiple users. According to the present invention, upon sending/receiving the e-mail message with the list of the multiple users, the message control module 12 can automatically ask a user 11 questions through a user interface (e.g., a visual interface using a line 27 and a display 18) regarding the creation of the ad-hoc list and/or applying further communication methods for contacting the users of the created ad-hoc group. The user interface can be also provided through audio means, a combination of visual and audio means and/or other possible haptic (e.g., tactile feedback) means. The user 11, in response to that inquiry, can send to the message control module 12 an instruction signal 26 containing specific instructions whether to create the ad-hoc group, whom to include in the ad-hoc group, whether this group should be permanent or temporary, what parameters (e.g., telephone numbers, session initiated protocol (SIP) addresses, wireless village IDs, etc.) about the users to include in the group-data, what immediate application to launch, etc.

In an alternative implementation of the present invention, the user 11 can initiate the creation of the ad-hoc group and launching the appropriate application using the instruction signal 26 without the inquiry from the message control module 12 as explained above (if, e.g., this feature is not available or disabled in the electronic device 10).

The group-data should contain parameters (i.e., alternative addresses via which the user can be contacted by using another communication method) for each of the users in the ad-hoc group for applying at least one further communication method (examples are discussed above) different from the pre-selected communication method (i.e., different from the context in which the group was created) for communicating of the electronic device 10 with at least one of the users in the ad-hoc group using at least one of the parameters, the parameters being different than the addresses contained in the e-mail message. The message control module 12 has capabilities to acquire (using an inquiry signal 28) additional information regarding said parameters from a remote service.

The group data, if created for a permanent use (as instructed by the user 11) can be stored in a user and group information storage module 16 for any future use. If the ad-hoc group is a temporary group and said group-data is used immediately by said electronic device 10 after being generated, the group-data is not stored in the group information storage module 16.

Figure 2:
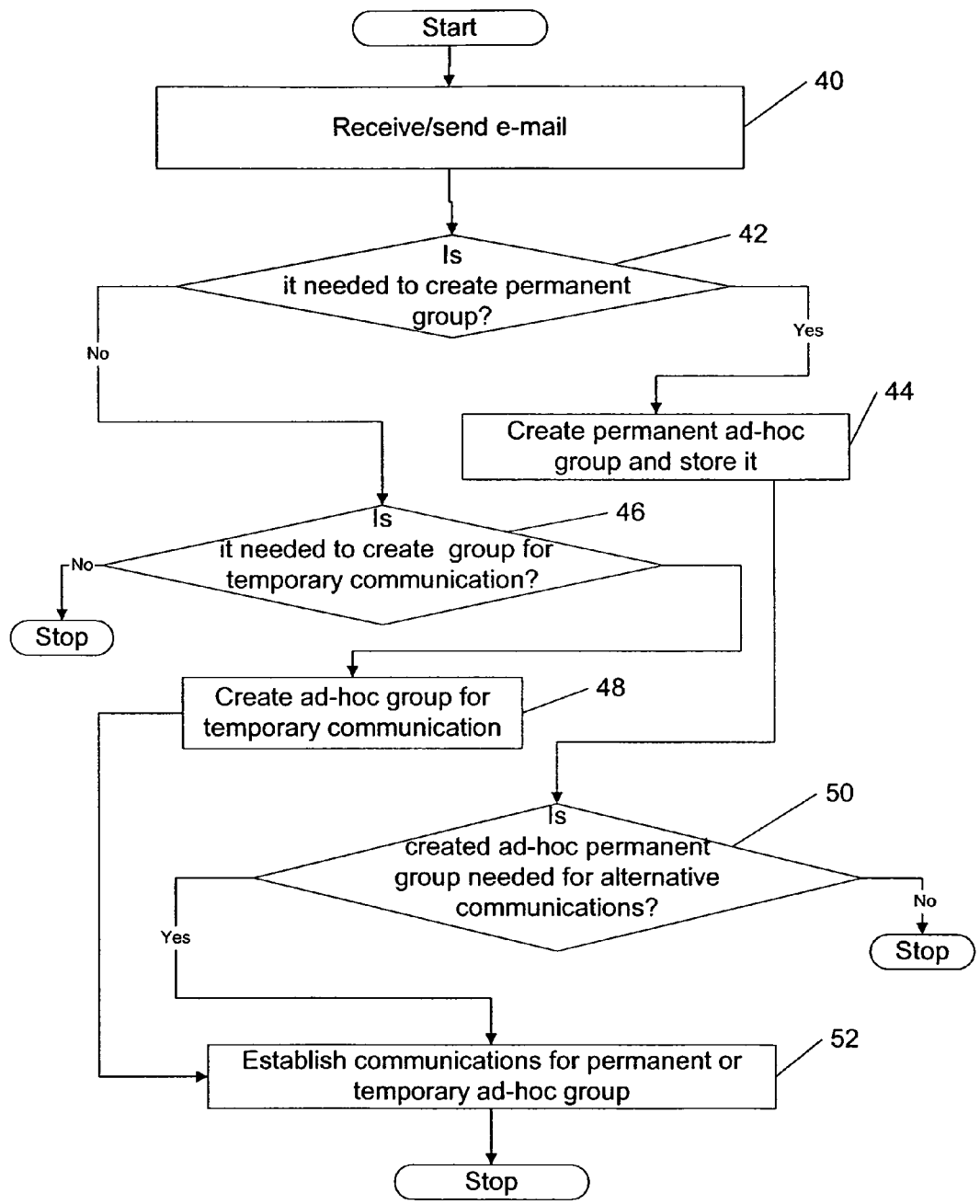
FIG. 2 is a flow chart demonstrating a performance of an electronic device for establishing an ad-hoc group based on addresses in an e-mail message received or sent by an electronic device, according to the present invention.

FIG. 2 shows a flow chart demonstrating a performance of an electronic device 10 (e.g., a portable communication device, a mobile electronic device or a mobile phone) for establishing an ad-hoc group based on addresses in the e-mail message received or sent by the electronic device 10, according to the present invention.

The flow chart of FIG. 2 represents only one possible scenario among many others. In a method according to the present invention, in a first step 40, the electronic device 10 sends or receives the e-mail message through the line 20.

In a next step 42, it is ascertained by the user 11, e.g., in response to the inquiry by the electronic device 10 communicated through the user interface (e.g., the display 18), whether it is needed to create the permanent ad-hoc group. As long as that is not the case, the process goes through steps 46 and 48 to step 52. However, if it is ascertained that the user 11 wants to create the permanent ad-hoc group, in a next step 44, the permanent ad-hoc group with the corresponding group-data is created by the message control module 12 of the electronic device 10 and stored in the user and group information storage module 16.

In a next step 50, it is ascertained whether the user 11 wants to use the created ad-hoc permanent group for alternative communication(s) (rather than e-mail). As long as that is not the case, the process stops. However, if it is ascertained that the user 11 wants to use the created ad-hoc group for the alternative communication(s), the electronic device 10 (e.g., the message control module 12 of the electronic device 10) facilitates establishing said alternative communication(s) with the appropriate users of the ad-hoc group.

If after step 42 the process goes to step 52 through steps 46 and 48, then in the step 46, it is ascertained by the user 11, e.g., in response to the inquiry by the message control module 12 of the electronic device 10 communicated through the user interface (e.g., the display 18), whether it is needed to create the temporary ad-hoc group. As long as that is not the case, the process stops. However, if it is ascertained that the user 11 wants to create the temporary ad-hoc group, in a next step 48, the permanent ad-hoc group with the corresponding group-data is created by the message control module 12 of the electronic device 10 but not stored in the user and group information storage module 16 of the electronic device 10.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   receiving or sending an email message using email communication by an electronic device, said message containing email addresses of multiple users; and
   creating, by said electronic device, group-data for an ad-hoc group of users out of said multiple users using said email addresses associated only with said users of said ad-hoc group,
   wherein said group-data contains one or more parameters for each of said users in said ad-hoc group, the parameters including alternative address information associated with each of the users in said ad-hoc group for instant message communication, the alternative address information being different than said email addresses used for said email communication by the electronic device.

2. The method of claim 1, wherein said group-data is stored in said electronic device for future use.

3. The method of claim 1, wherein said ad-hoc group is a temporary group and said group-data is not stored in said electronic device permanently.

4. The method of claim 1, wherein said electronic device has capabilities to acquire additional information regarding said parameters from a remote service.

5. The method of claim 1, further comprising:
   causing, at least in part, presentation of an option for creating said group-data for said ad-hoc group in a user interface associated with application for said email communication.

6. The method of claim 1, further comprising:
   determining to present an option for communicating with the ad-hoc group using the instant message communication using at least one of said parameters.

7. The method of claim 1, wherein creating said group-data is based on an instruction signal provided by a user.

8. A non-transitory computer readable storage medium carrying one or more sequences of one or more instructions which, when executed by one or more processors, cause an apparatus to perform at least the following steps:
   receiving or sending an email message using email communication by an electronic device, said message containing email addresses of multiple users, and
   creating, by said electronic device, group-data for an ad-hoc group of users out of said multiple users said email addresses associated only with said users of said ad-hoc group,
   wherein said group-data contains one or more parameters for each of said users in said ad-hoc group, the parameters including alternative address information associated with each of the users in said ad-hoc group for instant message communication, the alternative email address information being different than said email addresses used for the email communications by the electronic device.

9. An apparatus, comprising:
   at least one processor; and
   at least one memory including computer program code,
   the at least one memory and the computer program code configured to, with the at least one processor, cause the apparatus to perform at least the following,
   cause, at least in part, receiving or sending of an email message using email communication by an electronic device, said message containing email addresses of multiple users, and
   create group-data for an ad-hoc group of users out of said multiple users using said email addresses associated only with said users of said ad-hoc group,
   wherein said group-data contains one or more parameters for each of said users in said ad-hoc group, the parameters including alternative address information associated with each of the users in said ad-hoc group for instant message communication, the alternative email address information being different than said email addresses used for the email communication by the electronic device.

10. The apparatus of claim 9, wherein said apparatus is further caused, at least in part, to:
    determine to store said group-data for future use.

11. The apparatus of claim 9, wherein said ad-hoc group is a temporary group and said group-data is not stored in said apparatus permanently.

12. The apparatus of claim 9, wherein said apparatus is further caused, at least in part, to acquire additional information regarding said parameters from a remote service.

13. The apparatus of claim 9, wherein said apparatus is further caused to: determine to present an option for creating said group-data for said ad-hoc group by a user interface of an application used for said email communication.

14. The apparatus of claim 9, wherein the apparatus is further caused to: determine to present an option for communicating with the ad-hoc group using the instant message communication using at least one of said parameters.

15. The apparatus of claim 9, wherein creating said group-data is based on an instruction signal provided by a user.

16. An electronic device, comprising:
    receiving and sending means for receiving or sending an email message using an email communication containing email addresses of multiple users, and
    controlling means for creating group-data for an ad-hoc group of users out of said multiple users using said email addresses contained in said message associated only with said users of said ad-hoc group,
    wherein said group-data contains one or more parameters for each of said users in said ad-hoc group, the parameters including alternative address information associated with each of the users in said ad-hoc group for instant message communication, the alternative address information being different than said email addresses used for the email communication by said electronic device.

17. A message control module executed at a processor comprising:
    one or more modules configured to receive signaling containing information about creating an ad-hoc group of users out of multiple users with email addresses contained in a message communicated using email communication, and also configured to create the ad-hoc group having group-data using said email addresses associated only with said users of said ad-hoc group, wherein the ad-hoc group is based at least partly on the email addresses contained in the message communicated using the email communication, and further wherein the group-data is based at least partly on alternative address information other than the email addresses contained in the message for communicating with the ad-hoc group using instant message communication.

18. A message control module according to claim 17, wherein the signaling includes an instruction signal containing one or more of the following specific instructions: whether to create the ad-hoc group; whom to include in the ad-hoc group; whether the ad-hoc group should be permanent or temporary; what parameters, including telephone numbers, session-initiated protocol addresses, wireless village identifications, about users to include in the group-data; and what application to launch immediately.

\* \* \* \* \*